(12) United States Patent
Trainin et al.

(10) Patent No.: US 7,486,737 B2
(45) Date of Patent: Feb. 3, 2009

(54) APPARATUS AND METHOD OF CONTROLLING A PHYSICAL LAYER OF A COMMUNICATION DEVICE

(75) Inventors: Solomon Trainin, Haifa (IL); Oded Koren, Rehovot (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 10/811,906

(22) Filed: Mar. 30, 2004

(65) Prior Publication Data

US 2005/0220198 A1  Oct. 6, 2005

(51) Int. Cl.
*H04K 1/10* (2006.01)
(52) U.S. Cl. .................................... 375/260
(58) Field of Classification Search ......... 375/219–223, 375/260, 279; 713/160; 370/310, 509
See application file for complete search history.

(56) References Cited

U.S. PATENT DOCUMENTS

| | | | |
|---|---|---|---|
| 6,037,835 A * | 3/2000 | Smith et al. ............... | 329/316 |
| 6,859,466 B1 * | 2/2005 | Chen et al. ............... | 370/509 |
| 7,106,803 B1 * | 9/2006 | Hsu ........................... | 375/279 |
| 2001/0033625 A1 * | 10/2001 | Ninomiya et al. ........... | 375/316 |
| 2004/0120292 A1 | 6/2004 | Trainin | |
| 2004/0176043 A1 * | 9/2004 | Huh et al. ................. | 455/67.13 |
| 2005/0036570 A1 * | 2/2005 | Kwak et al. ................ | 375/316 |
| 2006/0126549 A1 * | 6/2006 | Bourlas et al. .............. | 370/310 |
| 2007/0118742 A1 * | 5/2007 | Abhishek et al. ............ | 713/160 |

* cited by examiner

*Primary Examiner*—Don N Vo
(74) *Attorney, Agent, or Firm*—Pearl Cohen Zedek Latzer, LLP

(57) ABSTRACT

Embodiments of the invention describe a method and device for controlling a physical layer of a communication device to operate in one of three modes of communication. In a first mode, the device is able to demodulate frames of a Complimentary Code Keying (CCK) modulation type. In a second mode, the device is able to demodulate frames of an Orthogonal Frequency Division Multiplexing (OFDM) modulation type. In a third, autodetection mode, the device is able to automatically detect the modulation type of a received frame and to configure the communication device to demodulate the received frame according to the detected modulation type. Control of the physical layer may be based on criteria related to prior transmissions received or transmitted by the communication device.

15 Claims, 5 Drawing Sheets

APPARATUS AND METHOD OF CONTROLLING A PHYSICAL LAYER OF A COMMUNICATION DEVICE

BACKGROUND OF THE INVENTION

In the field of wireless communication, a Wireless Local Area Network (WLAN) may include one or more wireless stations communicating with one or more wireless terminals such as Access Points (APs). Wireless communication may be performed in accordance with suitable standards, for example, Institute of Electrical and Electronics Engineers (IEEE) standards 802.11, 802.11a, 802.11b, or 802.11g.

Wireless Local Area Network (WLAN) devices that conform to the IEEE standard 802.11g, support both Complimentary Code Keying (CCK) and Orthogonal Frequency Division Multiplexing (OFDM) modulation schemes to transmit packet preamble/heading and packet payload, respectively. WLAN devices of this type, e.g., modems, may use a physical layer (PHY) controller to execute operations defined by a Finite State Machine (FSM). The PHY controller may be implemented in hardware (HW) and/or software (SW) and may be control the physical activation of receiver/transmitter components of the WLAN device to perform certain transmission and reception functions.

Some PHY controllers have an autodetection mode to determine whether an incoming signal is modulated in the CCK or the OFDM modulation schemes. In the auto-detection mode, both CCK and OFDM receiving components may be active and the PHY controller repeatedly detects the modulation type as part of the packet reception process for each incoming frame. This repeated detection may consume unnecessary power and may degrade the performance of the WLAN device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
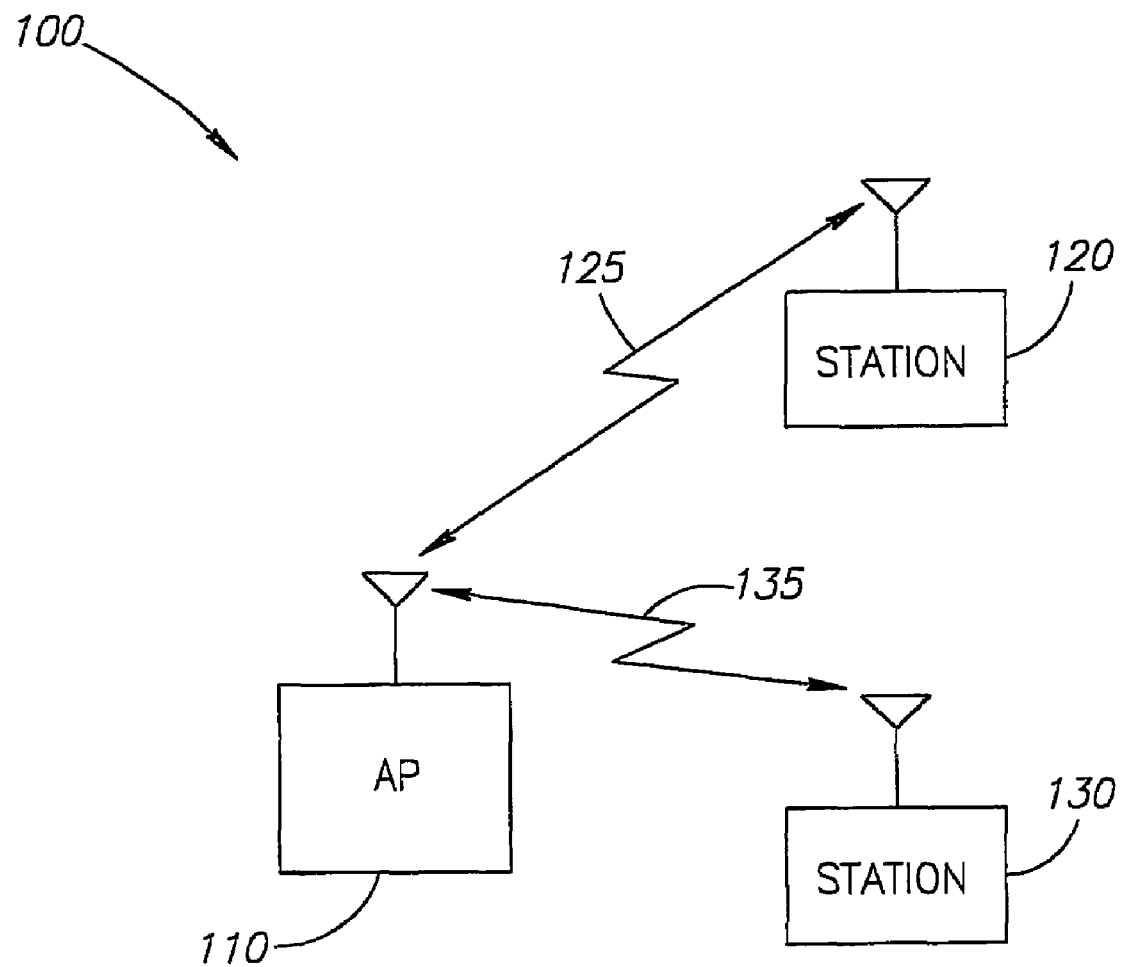
FIG. 1 is a schematic diagram of a WLAN according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, may be presented in terms of algorithms and symbolic representations of operations on data bits or binary digital signals within a computer memory. These algorithmic descriptions and representations may be the techniques used by those skilled in the art of data processing to convey the substance of their work to others skilled in the art.

Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in a variety of applications. Although the scope of the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like Types of WLAN stations intended to be within the scope of the present invention include, although are not limited to, mobile stations, access points, stations for receiving and transmitting spread spectrum signals such as, for example, Complementary Code Keying (CCK), Orthogonal Frequency-Division Multiplexing (OFDM) and the like.

Turning first to FIG. 1, a wireless communication system 100, for example, a WLAN communication system is shown. Although the scope of the present invention is not limited in this respect, the exemplary WLAN communication system 100 may be defined, e.g., by the IEEE 802.11-1999 standard, as a basic service set (BSS). For example, the BSS may include at least one communication station, for example, an access point (AP) 110, and stations 120 and 130, at least one of which may be a mobile unit (MU), if desired. In some embodiments, stations 130 and 120 may transmit and/or receive one or more packets over wireless communication system 100, for example, via wireless communication links 125 and 135, respectively, as is known in the art. The packets may include data, control messages, network information, and the like. Additionally or alternatively, in exemplary embodiments of the present invention, wireless communication system 100 may include two or more APs and two or more mobile stations. This arrangement of wireless communication system 100 may be referred to, e.g., by the IEEE 802.11-1999 standard, as an extended service set (ESS), although the scope of the present invention is not limited in this respect. Stations 120 and 130 as well as AP 100 may include a modem to receive and transmit packets or frames.

According to exemplary embodiments of the present invention, either or both of stations 120 and 130 may be capable of operating in one of three modes of reception. In a first mode of operation, the station processes incoming signals exclusively in accordance with a first type of modulation, e.g., an OFDM modulation type. In a second mode of operation, the station processes incoming signals exclusively in accordance with a second type of modulation, e.g., a CCK modulation. In a third mode of operation, the station automatically detects whether an incoming signal is of the first or second modulation type, and processes the signal in accordance with the detected modulation type. In exemplary embodiments of the invention, the station is able to select one of the three reception modes based on predetermined criteria, as described in detail below.

Figure 2:
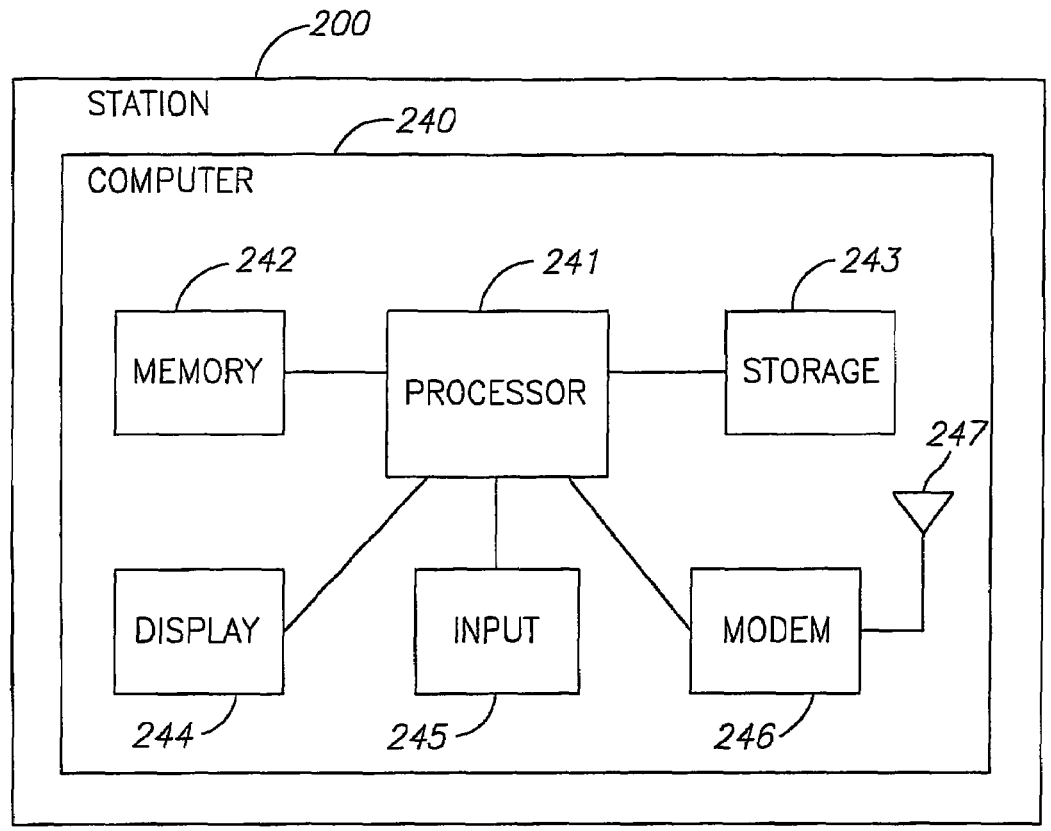
FIG. 2 is a schematic diagram of a wireless station in accordance with an exemplary embodiment of the invention.

Turning to FIG. 2, a station 200 according to exemplary embodiments of the invention, for example, station 120 or station 130 of FIG. 1, is illustrated.

In some embodiments, station 200 may include a personal computer, a desktop computer, a mobile computer, a laptop computer, a notebook computer, a Personal Digital Assistant (PDA) device, a tablet computer, a network device, a network, an internal and/or external modem and/or fax-modem device and/or card, a peripheral device, a WLAN device, or the like.

In the exemplary embodiment of FIG. 2, station 200 may include a computer or computing platform 240, which may include a processor 241, a memory unit 242, a storage unit 243, a display unit 244, an input unit 245, a WLAN modem 246, and an antenna 247.

Processor 241 may include, for example, a Central Processing Unit (CPU), a Digital Signal Processor (DSP), or any suitable specific and/or general and/or multi-purpose processor or microprocessor. Memory 242 may include, for example, a Random Access Memory (RAM). Storage unit 243 may include, for example, a hard disk drive. Display unit 244 may include, for example, a monitor. Input unit 245 may include, for example, a keyboard, a mouse, or a touch-pad.

Modem 246 may include, for example, a modem able to operate in accordance with one or more of the existing 802.11a standard, 802.11b standard, 802.11g standard, 802.11n standard and/or future versions of these standards, and/or any other suitable existing and/or future standard.

Antenna 247 may include an internal and/or external Radio Frequency (RF) antenna, for example, a dipole antenna. In some embodiments, antenna 247 may be integral to modem 246 and/or integrated within modem 246.

It will be appreciated by those skilled in the art that station 200 and/or computer 240 may include various other components and/or may be configured with additional and/or alternative units. Furthermore, station 200 and/or computer 240 may be implemented using any suitable combination of hardware and/or software, and may include any circuit, circuitry, unit or combination of integrated and/or separate units or circuits, as are known in the art, to perform desired functionalities. It is noted that the terms "circuit" and "circuitry" as used herein, may include any suitable combination of hardware components and/or software components. For example, station 200 may include detection circuitry, analysis circuitry, selection circuitry, comparison circuitry, processing circuitry, reception circuitry, engagement circuitry, reset circuitry, storage circuitry, one or more analyzer units, comparison units, decision units, processing units, storage units, detection units, buffers, memories, and various other types of units, components and/or circuitry, which may be used to perform methods and/or operations as discussed below in accordance with exemplary embodiments of the invention, and which may be implemented using any suitable combination of hardware components and/or software components (including, for example, applications, drivers, and/or operating systems) of station 200.

Modem 246 may receive and transmit frames via antenna 247. Modem 246 may use a PHY controller (FIG. 3), which may be implemented in HW or SW or any suitable combination of both, to control the activation of certain receiver/transmitter components according to the type of modulation used by station 200 to receive and/or transmit signals.

In accordance with exemplary embodiments of the invention, station 200 may operate in accordance with one of three modes of operation, as described above with reference to station 120 and/or 130 of FIG. 1. Station 200 is able to select one of three reception modes, based on criteria defined by embodiments of the present invention, as described in detail below. When station 200 is in the first mode of operation, modem 246 demodulates incoming signals in accordance with the first modulation type, e.g., OFDM, regardless of the actual modulation type of the signals, i.e., modem 246 does not attempt to detect the actual modulation type of the incoming signals. When station 200 is in the second mode of operation, modem 246 demodulates incoming signals in accordance with the second modulation type, e.g., CCK, without attempting to detect the actual modulation type of the incoming signals. When station 200 is the third, auto-detection, mode of operation, modem 246 may detect the modulation type of the incoming signals and modulate the signals accordingly.

Figure 3:
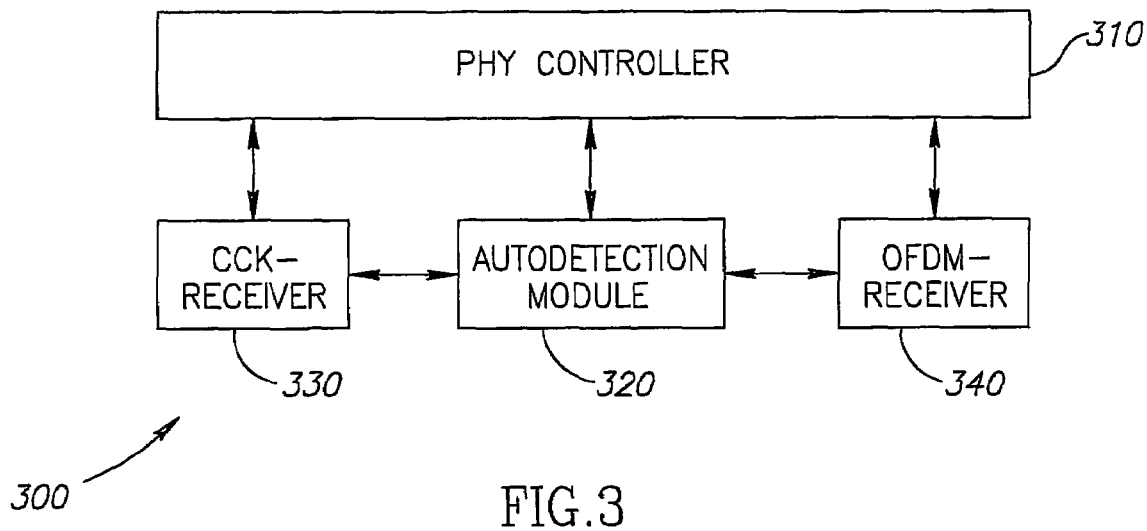
FIG. 3 is a schematic illustration of part of a CCK-OFDM communication device in accordance with an exemplary embodiment of the invention.

FIG. 3 is a schematic diagram of part of a communication device 300 able to transmit and receive transmissions in two modulation types, for example CCK and OFDM transmissions, according to an exemplary embodiment of the invention. Communication device 300 includes a PHY controller 310, which may control the activation of reception components of communication device 300. PHY controller 310 may be separately connected, e.g., directly or through suitable intermediate components (not shown), to a CCK receiver 330 and to an OFDM receiver 340. Additionally or alternatively, PHY controller 310 may be indirectly connected to both receivers 330 and 340 via an autodetection module 320. Autodetection module 320 may be used when a frame is received by the modem with or without any a priori knowledge of its modulation type. In some embodiments of the invitation, autodetection module 320 may detect whether the modulation type of the received frame is CCK or OFDM and may activate either CCK receiver 330 or OFDM receiver 340, respectively, to demodulate the received frame. If the PHY controller has prior knowledge of the modulation type of an incoming packet, for example, as described below, the PHY controller may activate either CCK receiver 330 or OFDM receiver 340 according to this prior knowledge.

According to some exemplary embodiments of the invention, when PHY controller 310 directly activates either CCK receiver 330 or OFDM receiver 340, autodetection module 320 may be bypassed and consumption of power by the autodetection module may be avoided. This may result in significant conservation of the power used by the communication device. Furthermore, direct activation of receivers 330 or 340 by PHY controller 310 may be more efficient than indirect activation via autodetection module 320 and, thus, direct activation may increase over-all modem throughput, for both CCK and OFDM modulated frames.

Figure 4A:
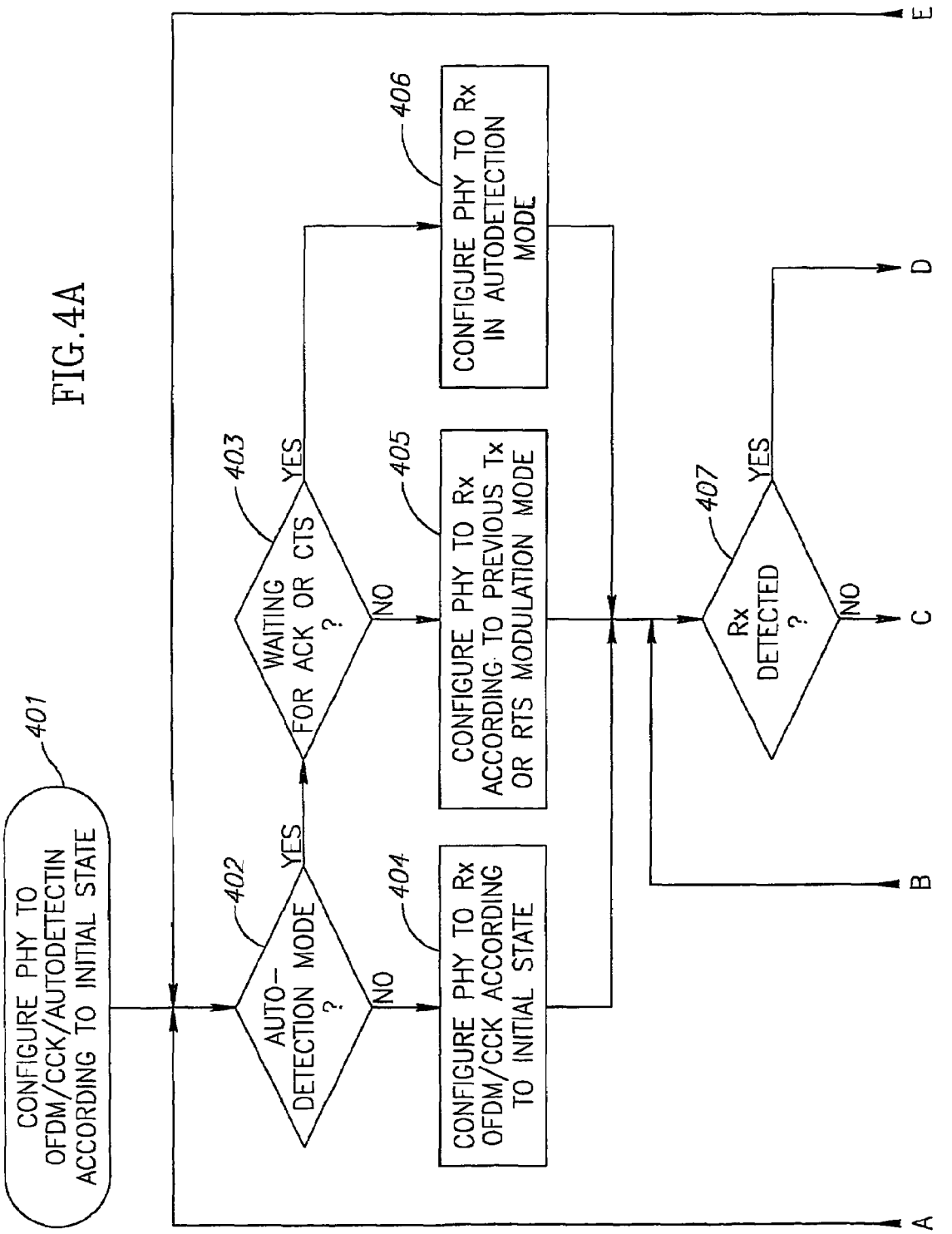
FIGS. 4A-4C depict a schematic flowchart of a method of wireless communication including physical layer (PHY) control according to exemplary embodiments of the present invention.
Figure 4B:
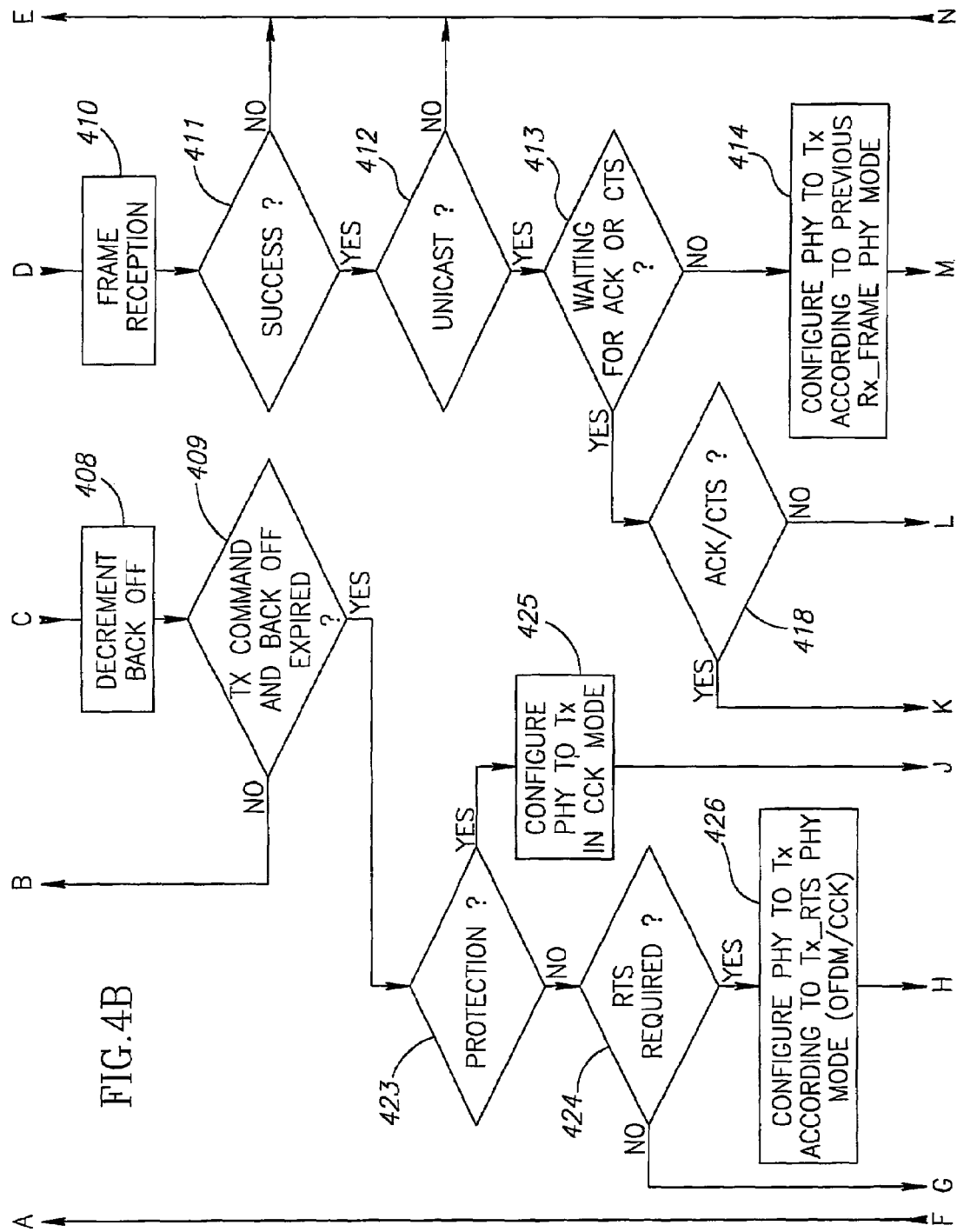
Figure 4C:
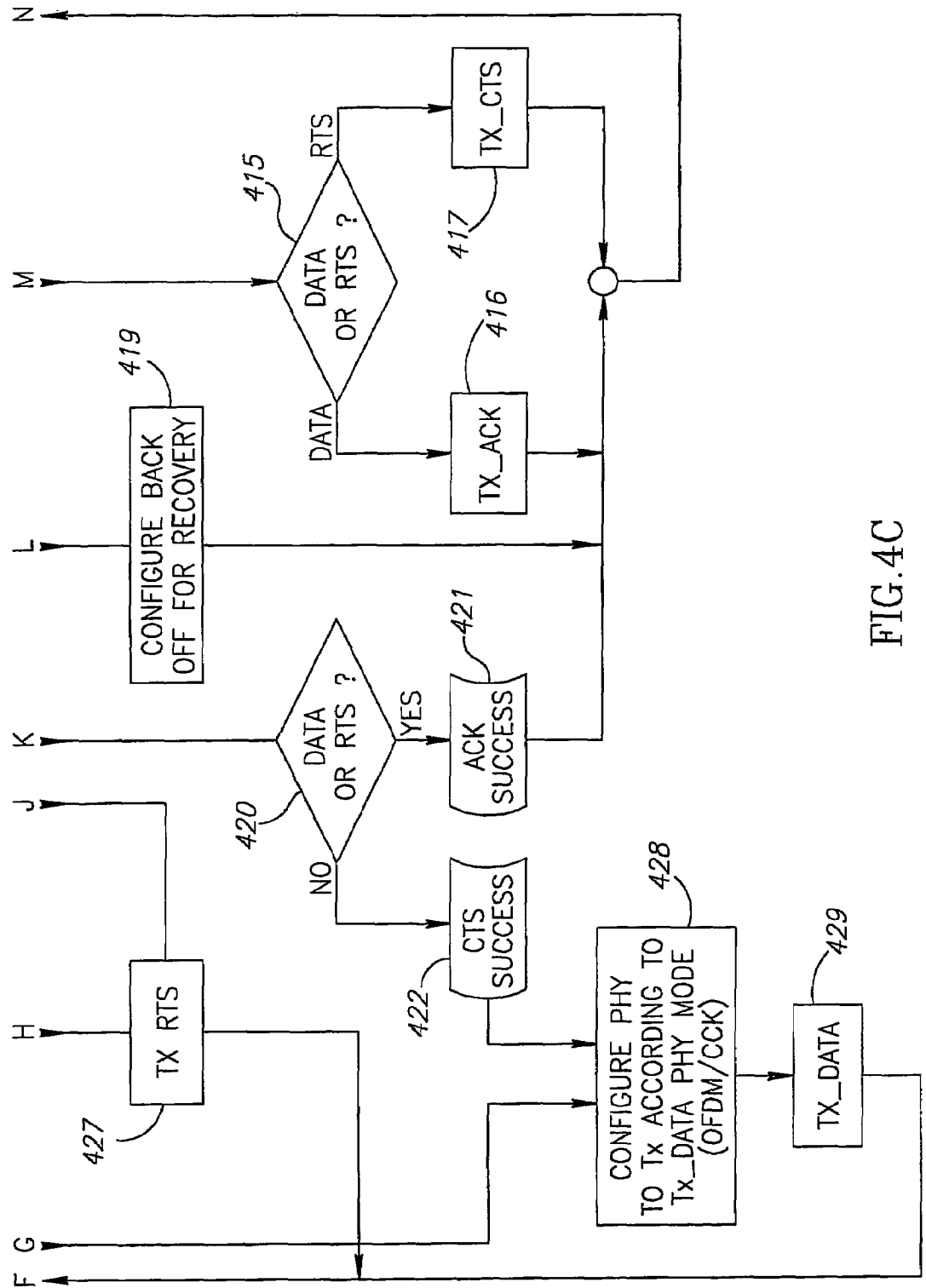

FIGS. 4A-4C schematically illustrate a flowchart of a physical layer control method according to exemplary embodiments of the present invention. The method of FIGS. 4A-4C may be implemented by a PHY controller of a communication, for example, controller 310 of FIG. 3, able to process signals of either of two modulation types, e.g., CCK and OFDM. Although the invention is not limited in this respect, it will be appreciated by persons skilled in the art that instructions of a Finite State Machine (FSM) realizing the control method of the present invention may be implemented by hardware and/or software in controller 310 (FIG. 3), modem 246 (FIG. 2), and/or one or more external processing units, for example, processor 241 (FIG. 1). Although the flowchart described in FIG. 4A-FIG. 4C may specify a set of operations and states, the scope of the present invention is not limited in this respect and the present invention may be embodied in other, similar in intent, operations and states. Although the individual operations of the method shown in FIG. 4A-FIG. 4C may be illustrated and described as separate operations, it should be noted that one or more of the individual operations may be performed concurrently. Further, the operations are not necessarily performed in the order illustrated.

In block 401 a PHY layer of the communication device may be configured by the PHY controller, e.g., PHY controller 310, to one of three communication modes: an OFDM mode, a CCK mode or an autodetection mode, according to an initial state defined for a given device, e.g., a certain type of modem, being used and/or a standard being used such as, for example, 802.11a, 802.11b or 802.11g. In block 402, the PHY controller may determine whether or not the PHY layer is in autodetection mode. If the initial state is not set for the autodetection mode, then in block 404 the PHY controller may configure the device to receive in either OFDM or CCK communication modes, depending on the initial state, and to wait for a frame. However, if the initial state is set to the autodetection mode, the controller may determine in block 403 whether the device is waiting for an "acknowledge" (ACK) or a "clear to send" (CTS) frame. If the device is waiting for an ACK frame, in block 405 the PHY layer may be configured to receive either in the CCK or OFDM communication mode, according to the modulation type of a last received data transmission and to wait for a frame. If the device is waiting for a CTS frame, in block 405 the PHY layer may be configured to receive in either the CCK or OFDM communication modes, according to the modulation type of a last received "request to send" (RTS) transmission, and to wait for a frame. If the device is in autodetection mode, and is not waiting for an ACK frame or a CTS frame, then in block 406 it may be configured to remain in autodetection mode and wait for a frame.

In block 407 the controller may determine whether an incoming signal has been detected. The PHY controller may generate a "back off" time period, for example a random period, during which transmissions by the device are deferred. If no signal is detected, the controller in block 408 may decrement the back off period until it expires. If there is no pending transmission, the method may return to block 407 and the device may wait for an incoming frame. If the device receives a command to transmit, when the back off period expires the method may proceed to block 423, as discussed below. The communication device may continue to wait for a frame, maintaining the last communication mode, e.g. CCK, OFDM or autodetection, established in blocks 404, 405 or 406, as long as no frame is detected and the device does not receive a command to transmit.

If a frame is detected, the device, e.g. the modem, may begin an acquisition procedure to receive the incoming frame in block 410. If the PHY layer is in OFDM communication mode or in CCK communication mode, a device receiver, for example, OFDM receiver 340 or CCK receiver 330 in the exemplary embodiment referenced in FIG. 3, may directly receive the incoming frame and demodulate it accordingly. If the PHY layer is in autodetection mode, an autodetection module, for example, autodetection module 320 referenced in FIG. 3, may automatically identify the modulation type that was used to modulate the received frame and may activate the appropriate receiving component, e.g., receiver 330 or receiver 340, to demodulate the frame.

In block 411 the controller may determine whether frame reception was successful, e.g., by performing a data integrity check, and/or address filtering, based on predetermined criteria, as is known in the art. If frame reception is unsuccessful, the method may return to block 402 and the PHY layer may be configured to continue waiting for an incoming frame. If frame reception is successful, the controller may determine, in block 412 whether it was a unicast or multicast frame. If the frame is multicast, e.g., directed at a group of recipients, no acknowledgement is required and the method may return to block 402. At this point the PHY layer may be configured to wait for a new incoming frame.

If frame reception is successful and unicast, the PHY controller may determine, in block 413, whether the device is waiting for an ACK or CTS frame.

if a unicast frame is successfully received and the modem is not waiting for an ACK or CTS frame, the PHY layer may be configured, in block 414, to a communication mode according to the modulation type in which the received frame was modulated, e.g., either CCK or OFDM. In block 415 the controller may determine whether the incoming signal is a data frame or a RTS frame. If the received frame is a data frame, an acknowledgement to the unicast frame is required and the modem may transmit an ACK frame, as indicated in block 416. The method may then return to block 402, and the PHY layer may be configured to wait for a new frame or for a command to transmit. If the received frame is a RTS frame, the modem may transmit a CTS frame in block 417, the method may return to block 402, and the PHY may be configured to wait for a new frame or for a command to transmit.

If a unicast frame is successfully received and the modem is waiting for an ACK or CTS frame, the controller may verify, in block 418, whether or not the correct ACK or CTS frame has arrived. If the received frame is not the correct frame, the PHY controller may generate a back off period during which transmissions are deferred, according to a predefined recovery protocol, as indicated in block 419. The method may then return to block 402 and the communication device may wait for a new incoming frame.

If the correct frame is received, the controller may determine in block 420 whether it is an ACK or CTS frame. In block 421, if the received frame is a successful ACK frame, as may be established based on an integrity check and/or address filtering as discussed above, the controller may complete reception and return to block 402, and the device may wait for a new frame or a command to transmit. If the received frame is a successful CTS frame recognized in block 422, the controller may configure the PHY layer for transmission in block 428, according to the predefined data modulation type, e.g., CCK or OFDM. In block 429 the data may be transmitted and then the method may return to block 402 and the PHY layer may be reconfigured to wait for an ACK frame.

Returning to block 409, described above, if the communication device receives a command to transmit and the back off period has expired, the method may proceed to block 423, in which the PHY controller may determine whether or not protection is required. If protection is required, in block 425 the controller may configure the PHY layer to a CCK communication mode and in block 427 the device may transmit a RTS frame. The method may then return to block 402 and the device may wait for a CTS frame in the CCK communication mode. If protection is not required, the controller may determine in block 424 whether transmission of a RTS frame is required. If transmission of a RTS frame is required, the PHY layer may be configured, in block 426, to a communication mode according to the RTS modulation type, e.g., either OFDM or CCK, defined for the device. In block 427 the RTS frame may be transmitted. The method may then return to block 402 and the modem may wait for a CTS frame in the communication mode according to the modulation type of the RTS frame. If a RTS frame is not required, in block 428 the PHY layer may be configured to the data transmission mode defined for the device, e.g., either OFDM or CCK, and the data may be transmitted in block 429. The method may then return to block 402 and the modem may wait for an ACK frame in the communication mode according to the modulation type of the transmitted data frame.

Some embodiments of the invention may be implemented, for example using a machine-readable medium or article which may store an instruction or a set of instructions that, if executed by a machine, for example, by a machine in stations 110, 120 and/or 130 (FIG. 1), by station 200 (FIG. 2), by components of communication device 300 (FIG. 3) and/or by other suitable machines, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A communication device comprising:
   a first receiver able to receive data frames of a first modulation type;
   a second receiver able to receive data frames of a second modulation type;
   an autodetection module able to automatically detect whether an incoming frame is of the first modulation type or the second modulation type; and
   a physical layer controller able to configure the communication device to operate in a mode of communication selected from a first communication mode, in which the first receiver is configured to receive the data frames of the first modulation type, a second communication mode, in which the second receiver is configured to receive the data frames of the second modulation type, and an autodetection mode, in which the autodetection module is to activate either the first receiver or the second receiver, wherein said controller is able to configure said communication device based on at least one criterion relating to a prior transmission received or transmitted by the communication device and said prior transmission comprises an outgoing Request To Send frame modulated in one of said first and second modulation types, and wherein the controller is able to configure said communication device to operate in either said first or second communication modes based on the modulation type of said Request To Send frame.

2. The communication device according to claim 1, wherein the first modulation type comprises Complementary Code Keying and wherein the second modulation type comprises Orthogonal Frequency Division Multiplexing.

3. The communication device according to claim 1 wherein said communication device is configured to receive a Clear To Send frame in said first or second communication modes based on said Request To Send frame.

4. A communication device comprising:
   a first receiver able to receive data frames of a first modulation type;
   a second receiver able to receive data frames of a second modulation type;
   an autodetection module able to automatically detect whether an incoming frame is of the first modulation type or the second modulation type; and a physical layer controller able to configure the communication device to operate in a mode of communication selected from a first communication mode, in which the first receiver is configured to receive the data frames of the first modulation type, a second communication mode, in which the second receiver is configured to receive the data frames of the second modulation type, and an autodetection mode, in which the autodetection module is to activate either the first receiver or the second receiver, wherein said controller is able to configure said communication device based on at least one criterion relating to a prior transmission received or transmitted by the communication device and said prior transmission comprises an outgoing data frame modulated in one of said first and second modulation types, and wherein the controller is able to configure said communication device to operate in either said first or second communication modes based on the modulation type of said outgoing data frame.

5. The communication device according to claim 4 wherein said communication device is configured to receive an Acknowledgement frame in said first or second communication modes based on a said outgoing data frame.

6. A method comprising:
   receiving an incoming data frame of either a first modulation type or a second modulation type; and
   configuring a communication device to operate in a mode of communication selected from a first communication mode, in which a first receiver is configured to receive data frames of the first modulation type, a second communication mode, in which a second receiver is configured to receive data frames of the second modulation type and an autodetection mode, in which an autodetection module, is able to automatically detect whether the incoming data frame is of the first modulation type or the second modulation type and to activate either the first receiver or the second receiver,
   wherein configuring comprises configuring the communication device based on at least one criterion relating to a prior transmission received or transmitted by the communication device and said prior transmission comprises an outgoing Request To Send frame modulated in one of said first and second modulation types, and wherein configuring comprises configuring said communication device to operate in either of said first or second communication modes based on the modulation type of said Request To Send frame.

7. A method according to claim 6, wherein the first modulation type comprises Complementary Code Keying and wherein the second modulation type comprises Orthogonal Frequency Division Multiplexing.

8. A method according to claim 6, further comprising: receiving a Clear To Send frame in the modulation type of said Request To Send frame.

9. A method comprising:
receiving an incoming data frame of either a first modulation type or a second modulation type; and
configuring a communication device to operate in a mode of communication selected from a first communication mode, in which a first receiver is configured to receive data frames of the first modulation type, a second communication mode, in which a second receiver is configured to receive data frames of the second modulation type and an autodetection mode, in which an autodetection module, is able to automatically detect whether the incoming data frame is of the first modulation type or the second modulation type and to activate either the first receiver or the second receiver,
wherein configuring comprises configuring the communication device based on at least one criterion relating to a prior transmission received or transmitted by the communication device and said prior transmission comprises an outgoing data frame modulated in one of said first and second modulation types, and wherein configuring comprises configuring said communication device to operate in either said first or second communication modes based on the modulation type used to transmit said outgoing data frame.

10. A method according to claim 9 further comprising receiving an Acknowledgement frame in the modulation type of said data frame.

11. A wireless communication system comprising:
a first communication station able to send a data frame transmission; and
a second communication station comprising:
a first receiver able to receive data frames of a first modulation Type;
a second receiver able to receive data frames of a second modulation type;
an autodetection module able to automatically detect whether an incoming frame is of the first modulation type or the second modulation type; and
a physical layer controller able to configure the second communication station, based on at least one criterion relating to a prior transmission received or transmitted by the second communication station, to operate in a communication mode selected from a first communication mode, in which the first receiver is configured to receive the data frames of the first modulation type, a second communication mode, in which the second receiver is configured to receive the data frames of the second modulation type, and an autodetection mode, in which the autodetection module is to activate either the first receiver or the second receiver,
wherein said prior transmission comprises an outgoing Request To Send frame from the second station, in one of said first and second modulation types, wherein the controller is able to configure the second station to operate in either said first or second communication modes based on the modulation type of said Request To Send Frame, and wherein the receiver is able to receive a Clear To Send frame sent by the first station in the modulation type of said Request To Send frame.

12. A wireless communication system according to claim 11, wherein the first modulation type comprises Complementary Code Keying and wherein the second modulation type comprises Orthogonal Frequency Division Multiplexing.

13. An article comprising a computer-readable storage medium, having stored thereon instructions that, when executed by a computing platform, result in:
receiving an incoming data frame of either a first modulation type or a second modulation type; and
configuring a communication device to operate in a mode of communication selected from a first communication mode, in which a first receiver is configured to receive data frames of the first modulation type, a second communication mode, in which a second receiver is configured to receive data frames of the second modulation type and an autodetection mode, in which an autodetection module is able to automatically detect whether the incoming data frame is of the first modulation type or the second modulation type and to activate either the first receiver or the second receiver,
wherein the instructions result in configuring the communication device based on at least one criterion relating to a prior transmission received or transmitted by the communication device, said prior transmission comprises an outgoing Request To Send frame modulated in one of said first and second modulation types, and wherein configuring comprises configuring said communication device to operate in either of said first or second communication modes based on the modulation type of said Request To Send frame.

14. The article of claim 13, wherein the first modulation type comprises Complementary Code Keying and wherein the second modulation type comprises Orthogonal Frequency Division Multiplexing.

15. The article of claim 13 wherein said prior transmission comprises receiving a Clear To Send frame in the modulation type of said Request To Send frame.

* * * * *